Oct. 7, 1958     J. K. BROWN     2,855,179

HIGH TEMPERATURE CERAMIC TURBINE

Filed Jan. 5, 1955

INVENTOR.
JOHN K. BROWN
BY
ATTORNEYS

United States Patent Office 2,855,179
Patented Oct. 7, 1958

2,855,179

HIGH TEMPERATURE CERAMIC TURBINE

John K. Brown, Sharon Hill, Pa., assignor, by mesne assignments, to the United States of America as represented by the Secretary of the Navy Application January 5, 1955, Serial No. 480,076

2 Claims. (Cl. 253—77)

This invention relates to the art of rotors subjected to high stresses and temperatures such as those found in use in gas turbines in the compressor and turbine thereof.

It is well known in the art that it is desirable to operate the turbine rotors of turbo-jet engines at high inlet temperatures. This temperature, however, is limited by the ability of the material forming the rotor, and more particularly the rotor blades to withstand the temperatures and stresses encountered. The known materials used for such purposes, usually metallic, rapidly lose strength when subject to the temperatures desired and exhibit unsatisfactory growth characteristics.

A more desirable material for such purposes would be a ceramic material which has the capability of withstanding high temperatures in excess of 3000° F. and would exhibit the requisite strength characteristics.

It is well known, however, that rotor blades formed of ceramic materials subjected to the same tensile stress under which metallic blades perform well, would fail. However, ceramic materials exhibit greater strength, or resistance to distortion, when subjected to compression loading rather than tension loading which is the type of loading encountered in the commonly used gas turbines.

Therefore, it is an object of this invention to provide a ceramic blade for rotors subjected to high temperatures and stresses which takes advantage of the ability of the ceramic to take high compressive loads.

It is a further object of this invention to provide a rotor for use in areas in which high temperatures are encountered and possessing the ability to withstand high stresses is required.

It is a still further object of this invention to provide a turbine rotor with ceramic blades wherein the blades are subjected to compression loading and wherein means are provided for delivery of cooling air to the blades and rotor periphery.

Other objects and many of the attendant advantages of this invention will be readily appreciated as the same becomes better understood by reference to the following detailed description when considered in connection with the accompanying drawing wherein.

Figure 1:
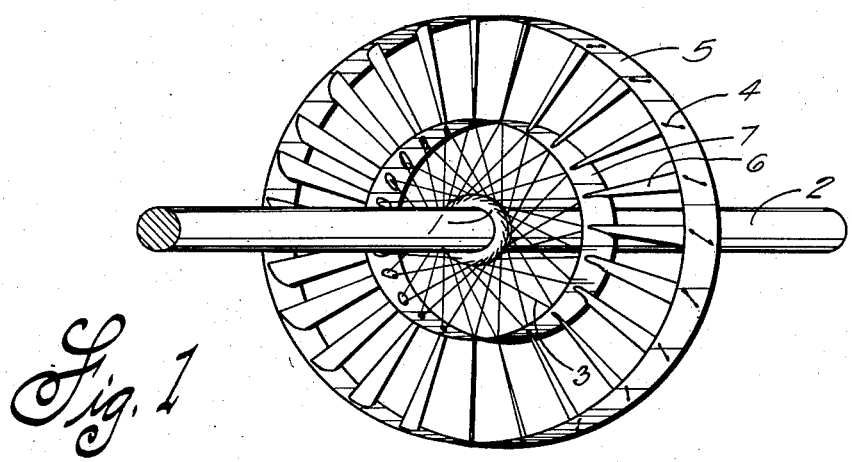
Figure 1 is an isometric view of a rotor assembly embodying the invention.
Figure 2:
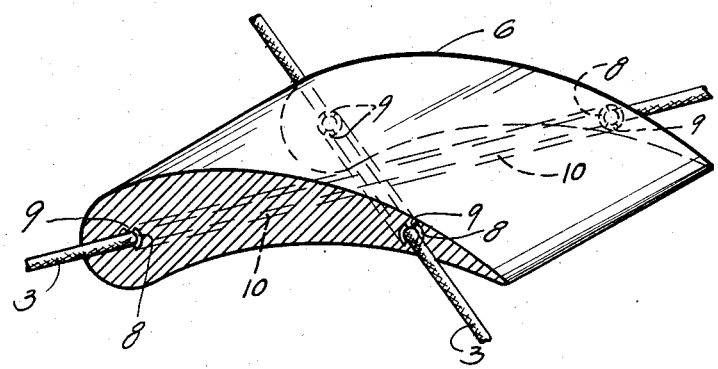
Figure 2 is a view of a turbine blade with cutoff portions of the blade supporting means passing therethrough.

As shown in Figure 1, the rotor may comprise a fastening ring or hub 1 fixedly mounted as by any suitable means, such as welding, brazing, pressfitting or by forming integrally therewith, on the shaft 2. This shaft may be the main shaft of a turbo-jet or the shaft of any sort of rotating machine wherein it is desired to provide a rotor capable of withstanding high temperatures and stresses.

A plurality of outwardly extending spokes 3 are connected to the fastening ring 1 and support a mounting ring or peripheral band 5 at their outer ends. The spokes 3 may comprise continuous elements wherein the end of each spoke is fastened to the ring 1 and the spoke extends outward passing through a rotor blade in a manner to be described hereinafter, then through suitable openings in the mounting ring 5 and bent back on itself to form a loop 4 and then inward to another point of connection with the fastening ring 1. Spoke arrangements may be used other than that described herein and illustrated in the drawing. For instance, the loop 4 may be substituted for by simply securing each spoke on the fastening ring 1 at one end and to the peripheral band 5 on the other.

Freely mounted on the spokes 3 are the rotor blades 6 formed of a suitable ceramic material. In the embodiment of the invention illustrated in the drawing, the blades 6 are provided with a pair of crossed longitudinal passages 8 through which the spokes pass. The passages 8 formed in the spokes are of a greater internal diameter and are provided with suitable spacers such as shown at 9. The spacers 9 provide for the proper positioning of the blades on the spokes and also insure an annular passage 10 between the spokes 3 and passages 8.

Mounted on the spokes 3 in between the blades 6 and the fastening ring 1 is a floating inner band 7 which functions generally to maintain the blades in position. The band 7 riding on the spokes does not hold the blades in a fixed position but rather acts as a resilient support against which the blades may move radially inward. It is to be noted however that the only effective restriction on the radial movement of the blades 6 is the mounting ring 5 which restricts their outward movement.

Upon rotation of the rotor, the centrifugal load thus generated is applied as a compression load to the ceramic blades 6 thus taking advantage of their inherent ability to withstand greater compressive stresses than tensile stresses.

Suitable pump and conduit mechanism is provided for forcing air through the annular passages 10. The air thus provided will function to cool the spokes 3 and mounting ring 5.

Obviously many modifications and variations of the present invention are possible in the light of the above teachings. It is therefore to be understood that within the scope of the appended claims the invention may be practiced otherwise than as specifically described.

What is claimed is:

1. A rotor having a hub, a plurality of spokes extending outwardly from said hub, said spokes being continuous elements having their ends connected to said hub and forming loops on their outer portions, an inner band mounted on said spokes in spaced relation to said hub, said spokes extending through said band, a plurality of ceramic blades disposed on said band having crossed longitudinal passages, one of said spokes passing through said passages in each of said blades, a mounting ring disposed on said blades and secured by said loops of said spokes.

2. A rotor as defined in claim 1 wherein the longitudinal passages in said blades are of larger cross-sectional area than said spokes.

References Cited in the file of this patent

UNITED STATES PATENTS

| 2,479,057 | Bodger | Aug. 16, 1949 |
| 2,500,745 | Bloomberg | Mar. 14, 1950 |

FOREIGN PATENTS

| 584,580 | Great Britain | Jan. 17, 1947 |
| 595,643 | Great Britain | Dec. 11, 1947 |
| 660,007 | Great Britain | Oct. 31, 1951 |